(12) United States Patent
Kato

(10) Patent No.: US 6,444,015 B2
(45) Date of Patent: Sep. 3, 2002

(54) APPARATUS FOR TREATING GAS CONTAINING SUBSTANCE TO BE DECOMPOSED AND METHOD OF TREATING ITS GAS

(75) Inventor: Kinya Kato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/880,762

(22) Filed: Jun. 15, 2001

(30) Foreign Application Priority Data

Jun. 16, 2000 (JP) .................................. 2000-181831

(51) Int. Cl.$^7$ ............................................. B01D 53/70
(52) U.S. Cl. ..................... 95/143; 95/148; 96/145; 55/421; 55/466; 210/748; 210/755; 210/192; 210/194; 210/908
(58) Field of Search ............................ 95/90, 143, 144, 95/148; 96/130, 145, 224; 55/421, 466; 210/748, 755, 756, 192, 194, 205, 908

(56) References Cited

U.S. PATENT DOCUMENTS

| | | | |
|---|---|---|---|
| 3,995,010 A | | 11/1976 | Smalley et al. ............. 423/240 |
| 5,122,165 A | * | 6/1992 | Wang et al. ................. 95/158 |
| 5,308,507 A | | 5/1994 | Robson ...................... 210/748 |
| 5,531,901 A | * | 7/1996 | Miyabe et al. .............. 210/668 |
| 5,904,750 A | * | 5/1999 | Cowles ........................ 95/109 |
| 6,136,203 A | * | 10/2000 | Butters et al. ........... 204/157.3 |

FOREIGN PATENT DOCUMENTS

| | | |
|---|---|---|
| EP | 0 841 305 | 5/1998 |
| EP | 0 968 739 | 1/2000 |
| JP | 52-43352 | 4/1977 |
| JP | 5-131113 | 5/1993 |
| JP | 7-328386 | 12/1995 |

* cited by examiner

Primary Examiner—David A. Simmons
Assistant Examiner—Frank M. Lawrence
(74) Attorney, Agent, or Firm—Fitzpatrick, Cella, Harper & Scinto (57) ABSTRACT

The apparatus of the present invention for treating a gas containing a substance to be decomposed comprises an adsorption unit equipped with an adsorbent for adsorbing the substance to be decomposed, a steam introduction unit for bringing steam into contact with the adsorbent, a condensation unit for obtaining a condensed liquid containing the substance to be decomposed from the steam containing the substance, a reaction tank, a condensed liquid supply unit for supplying the condensed liquid to the reaction tank, a hypochlorous acid supply unit for supplying a solution containing hypochlorous acid to the reaction tank, and a light irradiation unit for irradiating the reaction tank with light.

47 Claims, 3 Drawing Sheets

APPARATUS FOR TREATING GAS CONTAINING SUBSTANCE TO BE DECOMPOSED AND METHOD OF TREATING ITS GAS

BACKGROUND OF THE INVENTION

1. Field of the Invention

The present invention relates to a treatment apparatus and a treatment method for treating a gas containing organic substances used as organic solvents and the like by using an adsorbent. More particularly, the present invention relates to a technique of adsorbing in an adsorbent the organic substances used as organic solvents such as trichloroethylene, 1,1,1-trichloroethane, tetrachloroethylene, and the like and contained in the gas to be treated and then decomposing the organic solvents. The present invention can be preferably employed for treating organic solvents and the like polluting the environments such as soil, groundwater, and the like by gasifying the solvents or for treating a waste gas containing organic solvents and the like from a factory.

2. Related Background Art

Conventionally, an organic solvent-containing gas treatment apparatus using an adsorbent in a common manner has been employed to recover volatile organic solvents such as trichloroethylene, 1,1,1-trichloroethane, tetrachloroethylene, cis-1,2-dichloroethylene and Freons, by bringing a gas to be treated into contact with a porous adsorbent such as an activated carbon to adsorb and collect these solvents and then desorbing the adsorbed substances from the activated carbon by heating with steam or the like.

Such a system is composed of an activated carbon tower, a condenser to be connected to the discharge side of the activated carbon tower, a decanter, and an aeration tank to be connected to the drain side of the decanter. The organic solvents adsorbed in the activated carbon are desorbed from the activated carbon by bringing steam for activated carbon regeneration into contact with the activated carbon and incorporated into the steam, and then the steam is introduced into the condenser together with the solvents. The condenser is set to a temperature from 10 to 30° C. and liquefies the steam for regeneration discharged out of the activated carbon tower and then the resulting organic solvents and water are separated by gravity separation by the decanter. After that, further downstream, gaseous components and waste water are separated in the aeration tank and the resultant waste water is discharged outside to complete the treatment.

However, the foregoing conventional method possibly has the following problems:
(1) in some cases, a part of the recovered organic solvents is dissolved in waste water making it necessary to carry out further waste water treatment;
(2) in case of water-soluble organic solvents, recovery of organic solvents is sometimes difficult;
(3) if the organic solvents recovered by the decanter are reusable as they are, there is no problem. However, if they cannot be readily reused, they need to be treated to be reused or decomposed. If an incineration method is employed for the decomposition, there is a risk of causing further pollution such as dioxin generation; and
(4) polluting substances are discharged outside after separation of gaseous components and waste water in the aeration tank.

SUMMARY OF THE INVENTION

Hence, an object of the present invention is to provide a treatment apparatus and a treatment method for a substance to be decomposed not only which are capable of moving organic compounds such as organic solvents between media, but also which are useful for basically decomposing and eliminating the organic compounds without causing any waste water treatment problems.

Another object of the present invention is to provide an apparatus for treating a gas containing a substance to be decomposed, comprising adsorption means equipped with an adsorbent for adsorbing the substance to be decomposed, steam introduction means for bringing steam into contact with the adsorbent, condensation means for obtaining a condensed liquid containing the substance to be decomposed from the steam containing the substance, a reaction tank, condensed liquid supply means for supplying the condensed liquid to the reaction tank, hypochlorous acid supply means for supplying a solution containing hypochlorous acid to the reaction tank, and light irradiation means for irradiating the inside of the reaction tank with light.

Still, another object of the present invention is to provide a method for treating a gas containing a substance to be decomposed, comprising the steps of: (A) adsorbing the substance to be decomposed in an adsorbent by bringing a gas containing the substance to be decomposed into contact with the adsorbent, (B) shifting the substance to be decomposed to steam by bringing steam into contact with the adsorbent in which the substance to be decomposed is adsorbed, (C) obtaining a condensed liquid by condensing the steam containing the substance to be decomposed, (D) introducing the condensed liquid into a reaction tank and mixing the condensed liquid with a solution containing hypochlorous acid, and (E) decomposing the substance contained in the condensed liquid by irradiating the inside of the reaction tank with light.

The apparatus and the method of the present invention make it possible not only to move organic solvents between media, but also to basically decompose and eliminate pollutants from soil without causing any waste water treatment problems.

DETAILED DESCRIPTION OF THE PREFERRED EMBODIMENTS

The gas treatment apparatus and the gas treatment method of the present invention are as follows. The present apparatus for treating a gas containing a substance to be decomposed comprises adsorption means equipped with an adsorbent for adsorbing the substance to be decomposed, steam introduction means for bringing steam into contact with the adsorbent, condensation means for obtaining a condensed liquid containing the substance to be decomposed from the steam containing the substance, a reaction tank, condensed liquid supply means for supplying the condensed liquid to the reaction tank, hypochlorous acid supply means for supplying a solution containing hypochlorous acid to the reaction tank, and light irradiation means for irradiating the inside of the reaction tank with light.

The present method for treating a gas containing a substance to be decomposed comprises the steps of: (A) adsorbing the substance to be decomposed in an adsorbent by bringing a gas containing the substance to be decomposed into contact with the adsorbent, (B) shifting the substance to be decomposed to steam by bringing steam into contact with the adsorbent in which the substance to be decomposed are adsorbed, (C) obtaining a condensed liquid by condensing the steam containing the substance to be decomposed, (D) introducing the condensed liquid into a reaction tank and mixing the condensed liquid with a solution containing hypochlorous acid, and (E) decomposing the substance contained in the condensed liquid by irradiating the inside of the reaction tank with light.

The gas treatment apparatus and the gas treatment method of the present invention include the following embodiments. That is, the present invention includes an apparatus for treating a substance to be decomposed by light irradiation in the presence of chlorine, comprising:

(a) an adsorption tower having an adsorption treatment region in which an adsorbent for adsorbing a substance to be decomposed is installed, gas introduction means for introducing the gas containing a substance to be brought into contact with the adsorbent into the adsorption treatment region, gas discharge means for discharging a gas out of the adsorbent installation region, steam introduction means for introducing steam, which is to be brought into contact with the adsorbent to desorb the substance adsorbed in the adsorbent and regenerate the adsorbent, into the adsorption treatment region, and steam discharge means for discharging the steam brought into contact with the adsorbent out of the adsorption treatment region;

(b) a condenser for liquefying steam discharged by the steam discharge means and obtaining a condensed liquid containing the substance to be decomposed;

(c) a reaction tank for decomposing the substance in the condensed liquid discharged out of the condenser;

(d) condensed liquid supply means for supplying the condensed liquid to the reaction tank; and (e) hypochlorous acid solution supply means for supplying a solution containing hypochlorous acid to the reaction tank; wherein the reaction tank is equipped with a treatment region composed of a vapor phase part and a liquid phase part, mixed solution preparation means for preparing a mixed solution of the condensed liquid supplied by the condensed liquid supply means and the hypochlorous acid-containing solution supplied from the hypochlorous acid solution supply means as the liquid phase part, an aeration means for introducing a gas into the mixed solution, light irradiation means for irradiating the treatment region with light, and solution discharge means for discharging the solution existing in the liquid phase part. The present treatment method comprises:

(1) a step of adsorbing in an adsorbent a substance to be decomposed by light irradiation in the presence of chlorine by bringing a gas containing the substance to be decomposed into contact with the adsorbent;

(2) a step of shifting the substance to be decomposed to steam and regenerating the adsorbent by bringing steam into contact with the adsorbent adsorbing the substance to be decomposed;

(3) a step of obtaining a condensed liquid by condensing the steam containing the substance to be decomposed;

(4) a step of forming a vapor phase part and a liquid phase part contacting the vapor phase part in a treatment region provided in a reaction tank and producing the liquid phase part from a mixed solution obtained by mixing the condensed liquid and a hypochlorous acid-containing solution;

(5) a step of aerating the liquid phase part; and (6) a step of decomposing the substance contained in the treatment region by irradiating the treatment region with light.

It is preferable to employ, as a method for producing a hypochlorous acid-containing solution to be used for the present invention, a method involving potential application to water containing an electrolytic substance, a method involving a step of mixing at least one acid of inorganic acids and organic acids with an aqueous hypochlorous acid solution, and the like.

Operation of a treatment apparatus and a treatment method according to the present invention will be described below while exemplifying a case wherein pollutants in the soil or the like are decomposable organic solvents.

In a treatment apparatus and a treatment method according to the present invention, an adsorbent such as activated carbon and the like can be placed at a prescribed position in an adsorption tower. A gas containing the polluting substances extracted from soil or the like can be supplied to the adsorbent in the adsorption tower. At that time, the polluting substances in the gas are adsorbed in the adsorbent and the gas is purified. If the purification treatment is continued, the adsorbent is broken down and therefore, before the breakdown, the purification treatment is shifted to the regeneration treatment. That is, steam is supplied to the adsorption tower to isolate the polluting substances from the adsorbent and to carry out the regeneration treatment of the adsorbent (desorption treatment of the adsorbed substances) in the tower. The steam containing the desorbed polluting substances is liquefied through a condenser or the like. The liquefied polluting substance-containing water (polluted water) is mixed with a hypochlorous acid-containing solution in a reaction tank. The polluting substances can be decomposed by irradiating with light a gas obtained by aerating the resulting mixed solution.

By the above described operation procedure, the polluting substances are desorbed from the adsorbent and the adsorbent is regenerated. Also, the polluting substances separated from the adsorbent are decomposed to carry out a complete purification treatment.

Figure 1:
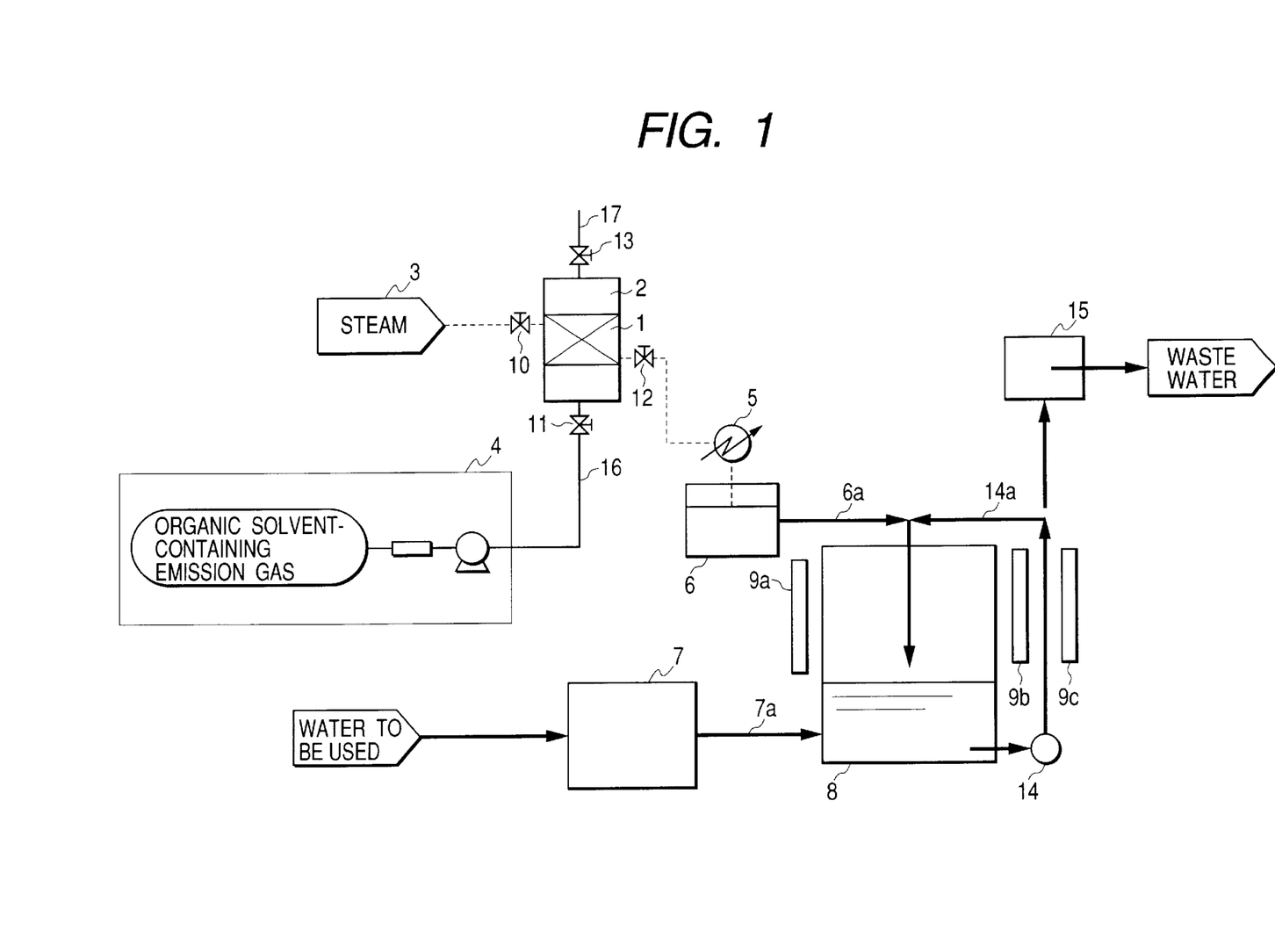
FIG. 1 is a diagrammatic illustration of an apparatus according to an embodiment of the present invention.

Hereinafter, an embodiment of the present invention will be described with reference to drawings. FIG. 1 shows an example of a system constitution in the case where the adsorbent is activated carbon and the substance to be decomposed is an organic compound usable as an organic solvent to be decomposed by light irradiation in the presence of chlorine. The system is provided at least with an activated carbon tower 2 as an adsorption tower containing activated carbon 1 as an adsorbent, a steam supply apparatus 3 for carrying out desorption with steam, means 4 for supplying a raw gas containing an organic solvent as the substance to be decomposed, a condenser 5 for condensing steam containing the desorbed substance to be decomposed, a tank 6 for storing the condensed liquid, an apparatus 7 for producing a solution containing hypochlorous acid, a reaction tank 8 for mixing a solution containing hypochlorous acid and the condensed liquid of the steam containing the organic solvent, and light irradiation means 9a for irradiating a treatment region in the reaction tank 8 with light.

In this case, the region of the activated carbon tower 2 in which the activated carbon 1 is installed constitutes an adsorption treatment region, and a pipe 16 equipped with a valve 11 constitutes a gas introduction means for introducing the raw gas to be brought into contact with the activated carbon 1 into the adsorption treatment region. Also, a pipe 17 equipped with a valve 13 constitutes a gas discharge means for discharging a gas from the region where the activated carbon is installed, and further a steam supply apparatus 3 and a pipe equipped with a valve 10 constitute a steam introduction means, and a pipe equipped with a valve 12 constitutes a steam discharge means for discharging the steam brought into contact with the activated carbon 2 out of the adsorption treatment region.

Between the condenser 5 and the reaction tank 8, there is a pipeline 6a composed of a pipe and the like and constituting a condensed liquid supply means for supplying the condensed liquid to the reaction tank 8. Between the hypochlorous acid-containing solution production apparatus 7 and the reaction tank 8, there is a pipeline 7a composed of a pipe and the like and constituting hypochlorous acid solution supply means.

The mixed solution containing the condensed liquid and the hypochlorous acid-containing solution constitutes the liquid phase part in the treatment region in the reaction tank 8. The liquid phase part composed of the mixed solution can be formed by a method comprising the steps of previously mixing the condensed liquid and the hypochlorous acid-containing solution and introducing the resulting mixture into the reaction tank 8; a method comprising a step of mixing the condensed liquid and the hypochlorous acid-containing solution in the reaction tank 8; a method comprising the steps of previously introducing the condensed liquid into the reaction tank 8 and then loading the reaction tank 8 with a material (for example, a reagent to be described somewhere later) for preparing the hypochlorous acid-containing solution; a method comprising the steps of loading the reaction tank 8 with a material (for example, a reagent to be described somewhere later) for preparing the hypochlorous acid-containing solution, preparing the hypochlorous acid-containing solution, and then mixing the condensed liquid with the solution; and the like.

The treatment by the system can be carried out as follows. At first, a raw gas containing an organic solvent is supplied to the activated carbon tower 2 and the organic solvent in the raw gas is adsorbed in the activated carbon 2 to purify the raw gas. When the activated carbon 1 in the activated carbon tower 2 adsorbs the organic solvent-containing substance and the threshold level of adsorption is exceeded, steam is introduced into the activated carbon tower 2 from the steam supply apparatus 3 to heat the activated carbon 1 and at the same time to desorb the adsorbed substance from the activated carbon 1 to the steam and to regenerate the activated carbon 1. A series of such steps is called a regeneration process.

Further, the steam containing an organic solvent desorbed from the activated carbon is introduced into the condenser 5 to be liquefied. The obtained liquid containing the organic solvent is mixed with the hypochlorous acid-containing solution from the hypochlorous acid-containing solution production apparatus 7 in the reaction tank 8. Further, light irradiation is carried out by a lamp, which is the light irradiation means 9a, in the reaction tank 8 to decompose the organic solvent contained in the vapor phase part constituting the treatment region and in the liquid phase part containing the mixed solution in the reaction tank 8. A series of such steps is called a purification and decomposition process.

The light irradiation part in the treatment part in the reaction tank 8 from the light irradiation means 9a can be selected corresponding to the type of the substance to be decomposed and prescribed decomposition efficiencies and the like, and in the case where the main decomposition reaction is carried out in the vapor phase part, as it will be described later, it is preferable to mainly irradiate the vapor phase part with light.

In this case, it is effective to carry out aeration stirring in the mixed solution using a pump for promoting decomposition (not shown in the drawings). Further, it is preferable to repeatedly circulate a part or all of the aerated gas to use it as a gas for aeration in the mixed solution. In addition, in case of aeration, the decomposition can be further improved by irradiating the vapor phase part containing the gas and the like generated by aeration with light. In such a manner, aeration of the mixed solution is effective in the case where the decomposition reaction mainly occurs in the vapor phase part. As a gas to be used for the aeration, air is preferable, however, a variety of gases are usable as long as the present invention is effective.

The volume ratio of the liquid phase and the vapor phase constituting the treatment region in the reaction tank 8 is preferably controlled to be within 10 to 80% by volume of the vapor phase in the entire treatment region.

Although FIG. 1 shows the case of using a single activated carbon tower, a plurality of towers may be installed. In case of employing a plurality of towers, the raw gas may be passed through a plurality of the respective towers in parallel and also may be passed successively through each tower while arranging the activated carbon towers in series like a merry-go-round. If the purification treatment is continued, the activated carbon is oversaturated. Therefore, before the oversaturation, the process is shifted toward regeneration.

It is preferable to additionally equip the apparatus according to the present invention with a circulation system for circulating a part of the mixed solution from the mixed solution in the reaction tank 8 by a pump 14. In the circulation system, it is also preferable, as shown in FIG. 1, to carry out light irradiation using light irradiation means 9b, 9c.

In case of carrying out light irradiation from light irradiation means 9b, 9c, if the concentration of the organic solvent in the solution passed through the light irradiation position by these light irradiation means is a standardized value or lower, the solution after the light irradiation can be discharged out of the system without returning the solution back to the reaction tank 8. In the system illustrated in FIG. 1, although the pipeline 14a for supplying the mixed solution passed through the circulation system to the reaction tank 8 and the pipeline 6a of the condensed liquid are joined to be extended to the inside of the reaction tank 8, these pipelines may be installed separately.

In the circulation process, shifting the organic solvent and chlorine to the vapor phase part from the mixed solution is promoted to further increase the decomposition efficiency. When the mixed solution is supplied to the reaction tank 8 again by circulation under light irradiation, it is preferable to mix the mixed solution with the condensed liquid based on necessity and discharge the solution like shower or spray (mist state) by a discharge means having the structures and the functions according to the purposes. Incidentally, in the case where chlorine exists in the vapor phase part and the light irradiation is carried out, the condensed liquid may also be discharged in a form of a shower or sprayed mist even if the condensed liquid is solely supplied to the reaction tank 8.

In the apparatus according to the present invention, a neutralization tank 15 for treating the mixed solution discharged out of the reaction tank 8 illustrated in FIG. 1 may be installed, and the pH of the solution to be discharged is mainly adjusted out in the neutralization tank 15.

Incidentally, the decomposition treatment in the reaction tank 8 and the circulation of the mixed solution according to the necessity can be controlled by a desired method, for example, a continuous method, a semi-continuously method, or a batch type method.

Incidentally, in the apparatus shown in FIG. 1, the raw gas to be treated may be subjected to a variety of pretreatments based on the necessity. Further, the gas discharged out of the activated carbon tower 2 may be subjected to a variety of post treatments as needed. Further, waste water from the neutralization tank 15 may also be subjected to a variety of post-treatments, if necessary. Additionally, selecting the post-treatment of the gases discharged out of the activated carbon tower 2 and the post-treatment of the waste water from the neutralization tank 15 can widen the range of the types of the substance to be treated which is contained in the raw gases to be treated in the activated carbon tower 2 in the adsorption treatment.

Hereinafter, the substance to be decomposed in the present invention and the respective constituent means of the apparatus according to the present invention will be described in more detail.

Adsorbent

In the foregoing embodiment, although activated carbon is described as the adsorbent, any adsorbent can be employed without any restrictions as long as it can be applicable for the apparatus and the method according to the present invention and can provide the effects of the present invention.

Substance to be Treated

The substances that can be treated by the adsorption treatment in the present invention include those that can be subjected to the adsorption tower as a gas in an evaporated state and collected by adsorbents and at least contain a substance to be decomposed in the reaction tank 8. Incidentally, the evaporated state of the substance to be treated may be obtained at a normal temperature and normal pressure and may be obtained by extraction at a reduced pressure or in a vacuum. In case of the evaporation extraction under a reduced pressure, the gas to be treated can be introduced into the adsorption tower and adsorbed by an adsorbent while maintaining the reduced pressure state.

The substance to be decomposed includes substances capable of being decomposed by light irradiation in the presence of chlorine, for example, halogenated aliphatic hydrocarbon compounds, which are used as organic solvents and cause environment pollution when discarded. The halogenated aliphatic hydrocarbon compounds include aliphatic hydrocarbon compounds substituted with chlorine and/or fluorine, and practical examples are chloroethylene, 1,1-dichloroethylene (vinylidene chloride), cis-1,2-dichloroethylene, trans-1,2-dichloroethylene, trichloroethylene, tetrachloroethylene, chloromethane, dichloromethane, 1,1,1-trichloroethane, Freon 113, chloroform and the like.

The treatment apparatus according to the present invention is applicable to purification of the vacuum extracted gases, gases obtained by aerating pumped up groundwater, waste gases from chemical plants for purification treatment of polluted soil and groundwater. That is, pollutant gases can be treated only by introducing the pollutant gases directly into the apparatus of the present invention.

The condensed water obtained in the condenser after the desorption by steam is sometimes separated into two layers depending on the types and the concentrations of the substance to be decomposed. For example, in case of trichloroethylene, if the concentration is about 1000 mg/L or lower, the separation into two layers does not occur, whereas when the concentration is higher than about 1000 mg/L, trichloroethylene is not dissolved and the condensed water is separated into two layers. In the latter case, only the upper layer may be subjected to the decomposition treatment in the reaction tank 8. Even if trichloroethylene is not dissolved, it can be sufficiently decomposed by the present invention if the fraction is about 1.0% (equivalent to 10000 mg/L) in the reaction tank.

Solution Containing Hypochlorous Acid

In the reaction tank 8, the condensed liquid and the hypochlorous acid-containing solution are mixed. The mixed solution should preferably have the hydrogen ion concentration (pH value), for example, not lower than 1 and not higher than 4, more preferably not lower than 2 and not higher than 3, and the remaining chlorine concentration not lower than 5 mg/L and not higher than 200 mg/L, more preferably not lower than 30 mg/L and not higher than 120 mg/L. The method applicable to produce such a mixed solution can broadly be classified as follows: a method of mixing a condensed liquid with functional water produced by electrolysis or a method of mixing the condensed liquid with a hypochlorous acid-containing solution produced by using a reagent.

Functional Water Produced by Electrolysis

An electrolytic substance, for example, sodium chloride and/or potassium chloride, is dissolved in raw water before electrolysis and the resulting water is electrolyzed in a water tank having a pair of electrodes to obtain a solution called an electrolytic water, electrolyzed functional water, functional water, and the like and used for the purpose of disinfection. The concentration of the electrolytic substance in the raw water before electrolysis is preferably 20 to 2000 mg/L and more preferably not lower than 200 and not higher than 1000 mg/L for sodium chloride. The obtained solution (functional water) can be employed for the present invention.

An example of an apparatus for producing the functional water is one comprising a water tank, a means for supplying water containing an electrolytic substance to the water tank, a pair of electrodes for applying potential to the electrolytic substance-containing water in the water tank, and an electric power source, as a means for producing a hypochlorous acid-containing solution.

Further, at the time of using such an apparatus, acidic electrolytic water produced in the peripheral part of the anode and alkaline electrolytic water produced in the peripheral part of the cathode can be prevented from being mixed with each other by installing a separation membrane between the pair of electrodes to efficiently carry out electrolytic decomposition and the acidic electrolytic water produced in the peripheral part of the anode can preferably be used as the functional water. As the separation membrane, for example, an ion exchange membrane and the like can preferably be employed. As a means for obtaining such functional water, a strongly acidic electrolytic water production apparatus widely sold on the market (for example, trade name: OASIS BIOHALF; produced by Asahi Glass Engineering Co., Ltd.; trade name: Strongly electrolytic water production apparatus Model FW-200; Amano Co., Ltd.; and the like) can be employed.

Hypochlorous Acid-Containing Solution Produced from Reagent

A solution containing hypochlorous acid and having the same properties as those of the functional water produced by electrolysis can also be produced using a reagent. For example, one or more of acids selected from organic acids and inorganic acids are added to an aqueous hypochlorite solution to obtain a hypochlorous acid-containing solution. Hypochlorites used herein are sodium hypochlorite and/or potassium hypochlorite. As the inorganic acids and organic acids, it is possible to use hydrochloric acid, hydrofluoric acid, nitric acid, sulfuric acid, phosphoric acid, boric acid, acetic acid, formic acid, malic acid, citric acid, and/or oxalic acid. Preferable among them are inorganic acids such as hydrochloric acid, hydrofluoric acid, nitric acid, sulfuric acid, phosphoric acid, boric acid, and the like.

Preparation of the hypochlorous acid-containing solution by mixing a reagent can be conducted by using, for example, an apparatus comprising a first tank containing an aqueous hypochlorite solution, a second tank for storing at least one of an inorganic acid and an organic acid, and means for preparing a hypochlorous acid-containing solution by mixing the aqueous hypochlorite solution and an acid from the second tank.

As a hypochlorous acid-containing solution prepared by mixing such reagents, a solution for preparing the mixed solution having the foregoing characteristics can be produced. For example, a hypochlorous acid-containing solution usable for the above-described application can be obtained by controlling the concentration of hydrochloric acid to be from 0.001 mol/L to 0.1 mol/L, sodium chloride from 0.005 mol/L to 0.02 mol/L, and sodium hypochlorite from 0.0001 mol/L to 0.01 mol/L.

Further, by using hydrochloric acid and a hypochlorite, a hypochlorous acid-containing solution having a pH of 4.0 or lower and the chlorine concentration of 2 mg/L or more can be produced. For example, such a hypochlorous acid-containing solution can be produced by controlling the hydrochloric acid concentration to be 0.001 mol/L to 0.1 mol/L and the sodium hypochlorite concentration to be 0.0001 mol/L to 0.01 mol/L.

Light Irradiation Means

As the light irradiation means to be employed for the present invention, light to be radiated preferably has a wavelength of 300 to 500 nm and more preferably of 350 to 450 nm. Regarding the light irradiation intensity to the substance to be decomposed, the intensity of several hundred $\mu W/cm^2$ (measured between wavelengths of 300 to 400 nm) is enough to sufficiently promote practical decomposition in case of a light source having a peak near 360 nm wavelength. In the present invention, it is not at all necessary to use ultraviolet rays of wavelengths near 250 nm or shorter, which rather significantly affect the human body. This means that there is no need to use a costly material such as quartz, which transmits light at a wavelength of 300 nm or shorter, for a module of the reaction tank or the like. Economical glass and plastics and the like can be used in the present invention.

As a light source, natural light (e.g. sunlight and the like) and artificial light (a mercury lamp, a black light, a color fluorescent lamp, and the like) can be employed.

Although the details of the mechanism of the decomposition are not clear, the water produced in the peripheral part of the anode by electrolysis of water containing an electrolytic substance such as sodium chloride and the like contains hypochlorous acid or a hypochlorite ion, and hypochlorous acid or the water containing hypochlorous acid is acidic. Therefore it is presumed that the chlorine ratio is increased. That is just the same as the case of adding an acid to a hypochlorous acid-containing solution. It is also presumed that the light irradiating the solution probably induces radicals, such as a chlorine radical or the like, to promote the above-described decomposition. Therefore, the decomposition is supposedly promoted not only in the liquid phase but also in the vapor phase. In the case where the decomposition is mainly generated in the vapor phase part, the light irradiation method may be selected from a method in which light irradiation is carried out in both of the vapor phase part and the liquid phase part, a method in which light irradiation is carried out mainly in the vapor phase part, and a method in which light irradiation is carried out only in the vapor phase part. In this case, air is led to the mixed solution to aerate the mixed solution, so that chlorine from which chlorine radicals contributing to the decomposition of the substance, for example, trichloroethylene, are derived can effectively be shifted to the decomposition reaction field, and light irradiation to chlorine further promotes the decomposition using the radical.

Techniques of treating polluting gases such as extracted gases from polluted soil by using an activated carbon have been known widely according to, for example, Japanese Patent Application Laid-Open No. 7-328386 and the like. However, many of these techniques involve only adsorptive removal of pollutant substances by the activated carbon, which is merely the shift of the pollutant substances between media, but do not include decomposition of pollutant substances. On the other hand, the method disclosed in Japanese Patent Application Laid-Open No. 5-131113 or the like involves decomposition of pollutant substances by exposing them to arc discharge. However, a method comprising such a step often requires a large quantity of energy.

According to the present invention, by using an apparatus with a simple constitution, a substance can be efficiently decomposed at a normal temperature and a normal pressure. Hence, the present invention can preferably be applied to the treatment of polluted soil and water, as well as the industrial waste water As described above, although FIG. 1 exemplifies a system in which a pollutant substance (organic solvent) in a raw gas is removed from the raw gas by an activated carbon, and at the time when the adsorption by the activated carbon is oversaturated by the adsorption treatment, the activated carbon is subjected to the regeneration treatment and a reaction tank is employed for decomposing the organic solvent separated from the activated carbon at the time of the regeneration treatment, the system is capable of alternately conducting the raw gas adsorption treatment process and the regeneration treatment process of the activated carbon, including the recovery of the organic solvents from the activated carbon and the decomposition of the organic solvents recovered in the reaction tank.

Figure 2:
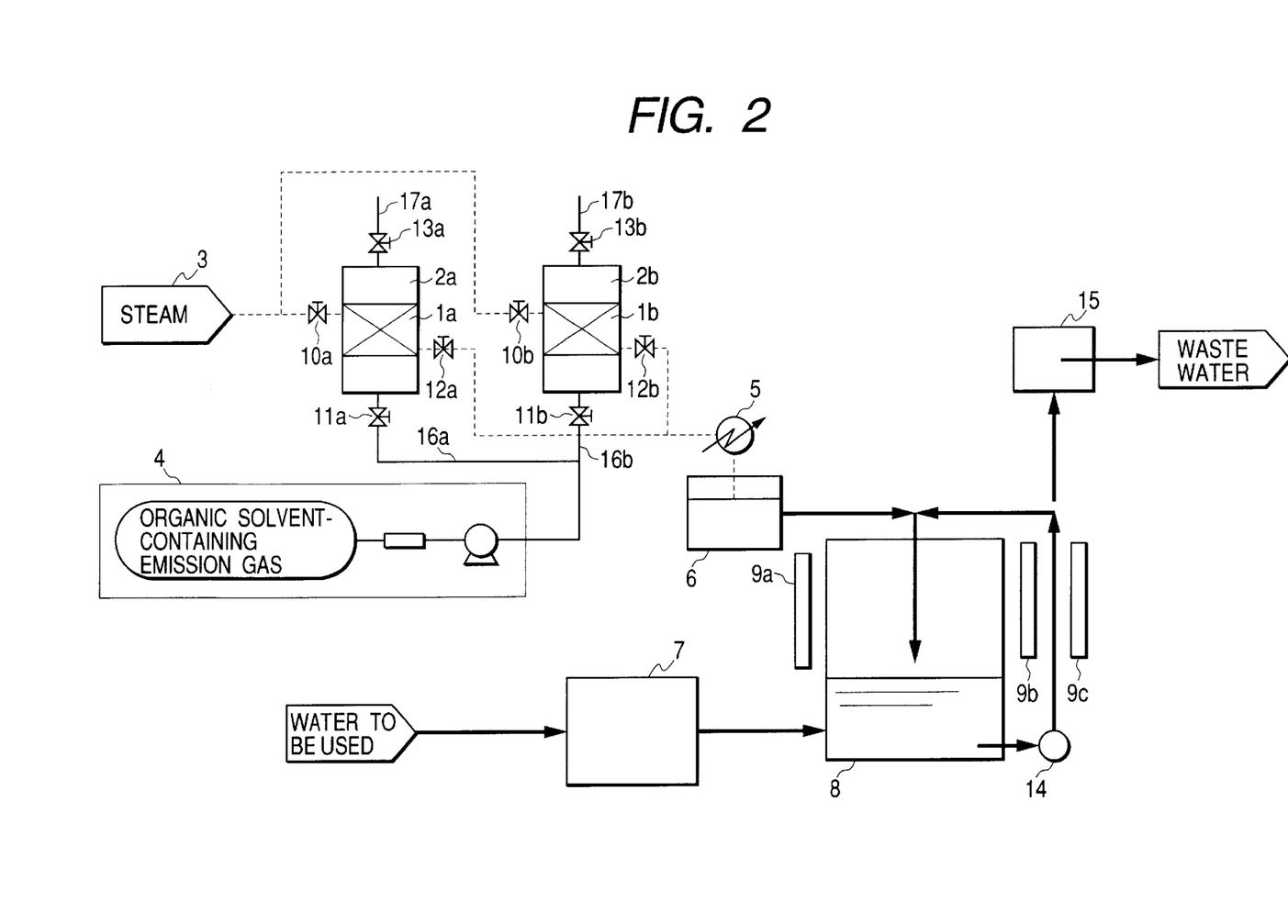
FIG. 2 is a diagrammatic illustration of an apparatus according to another embodiment of the present invention.

FIG. 2 shows such an example. In this system, a pair of activated carbon towers 2a and 2b are installed and raw gas supply routes 16a and 16b and raw gas discharge routes 17a and 17b are provided separately for the respective activated carbon towers 2a and 2b. A reaction tank 8 is installed, so that desorbed water is supplied from the activated carbon towers 2a and 2b through a condenser 5 and a tank 6 for storing the condensed liquid, and the reference numeral 7 shows a functional water production apparatus for supplying a hypochlorous acid-containing solution (functional water).

The operation state of the system shown in the illustrate is as follows: the components installed on the right side are operated for removing the organic solvent from the raw gas and those on the left side are in the regeneration process of the activated carbon.

The respective opening and closing valves 10a, 10b, 11a, 11b, 12a, 12b, 13a, and 13b are composed so as to alternately carry out the adsorption removal process for the organic solvent from the raw gas and the regeneration process for the activated carbon by opening and closing the valves according to a prescribed program. The raw gas flows through the supply route 16b and enters the activated carbon tower 2b through the supply control valve 11b to be subjected to the adsorption treatment. After completion of the adsorption treatment, the gas is discharged out of the discharge route 17b. During the adsorption treatment in the activated carbon tower 2b, the regeneration treatment is carried out in the activated carbon tower 2a. That is, the control valves 11a and 13a are closed and the valves 10a and 12a are opened to supply steam from the steam supply apparatus 3 to the activated carbon tower 2a and to heat the activated carbon tower 2a. The adsorbed substance is desorbed from the activated carbon la to regenerate the activated carbon 1a.

The steam containing the organic solvent is liquefied by the condenser 5, and the condensed liquid is introduced into the reaction tank 8 through the tank 6 for storing the condensed liquid. The mixed solution in the reaction tank 8 is prepared to be a desired solution containing hypochlorous acid by the functional water production apparatus 7. Further, light irradiation is carried out in the reaction tank 8 by a lamp as the light irradiation means 9a to decompose the adsorbed substance. By using a blower or the like, acceleration means may be provided to positively shift the substance to be decomposed, chlorine and the like to the vapor phase part.

Thus, a continuous treatment of pollutant substances and regeneration of the activated carbon by alternately carrying out the adsorption removal and regeneration of the activated carbon is possible.

Hereinafter, the present invention will be more particularly described according to examples.

EXAMPLE 1

The example for experimentally confirming the effects of the present invention will be described below. Using the apparatus illustrated in FIG. 1, a waste gas containing trichloroethylene and the like was treated. The flow rate of the waste gas to be treated was 0.5 m$^3$/min and the treatment gas concentration was about 70 to 150 ppmV. The concentration of trichloroethylene in the condensed and desorbed water obtained by steam desorption from activated carbon was about 94 mg/L. Further, dichloromethane, tetrachloroethylene, 1,1,1-trichloroethane, and cis-1,2-dichloroethylene were 14 mg/L, 32 mg/L, 22 mg/L, and 11 mg/L, respectively. The desorbed water 20 L in volume was introduced into a reaction tank 8 having a capacity of 50 L. Further, 12 mL of a 12% sodium hypochlorite solution (Kishida Chemical Co., Ltd., the content of about 12% at the time of production, as active chlorine: min 5%) and 6 mL of hydrochloric acid (35% hydrochloric acid) were added thereto. As a result, the pH and the remaining chlorine concentration of the polluted desorbed water were 2.5 and 70 to 90 mg/L, respectively.

Through glass faces in both sides of the reaction tank 8, light irradiation of the treated water was carried out in the vapor phase part. The light irradiation was carried out by installing each 10 black light fluorescent lamps 4 (trade name: FL10BLB; produced by Toshiba Corporation, 10 W) in both sides.

After operating for 1 hour, the treated water was discharged out and a part of the water was introduced into a container containing 100 mL of n-hexane, and after being stirred for 10 minutes, the n-hexane layer was fractionated and subjected to ECD gas chromatography to measure the amounts of trichloroethylene, dichloromethane, tetrachloroethylene, 1,1,1-trichloroethane, and cis-1,2-dichloroethylene. The measurement of the concentrations of pollutant substances in the vapor phase part was carried out by sampling the vapor phase part of the purification tank by a gas-tight syringe and carrying out gas chromatography (trade name; GC-14B equipped with an FID detector; produced by Shimadzu Corporation, the column DB-624 produced J & W Co.).

As a result, none of trichloroethylene, dichloroethane, tetrachloroethylene, 1,1,1-trichloroethane, and cis-1,2-dichloroethylene were detected in the sample of the n-hexane layer from the treated water after a 1 hour operation. Further, these pollutant substances were not detected in the sample from the vapor phase part making it clear that the desorbed water containing pollutant substances was purified.

EXAMPLE 2

Figure 3:
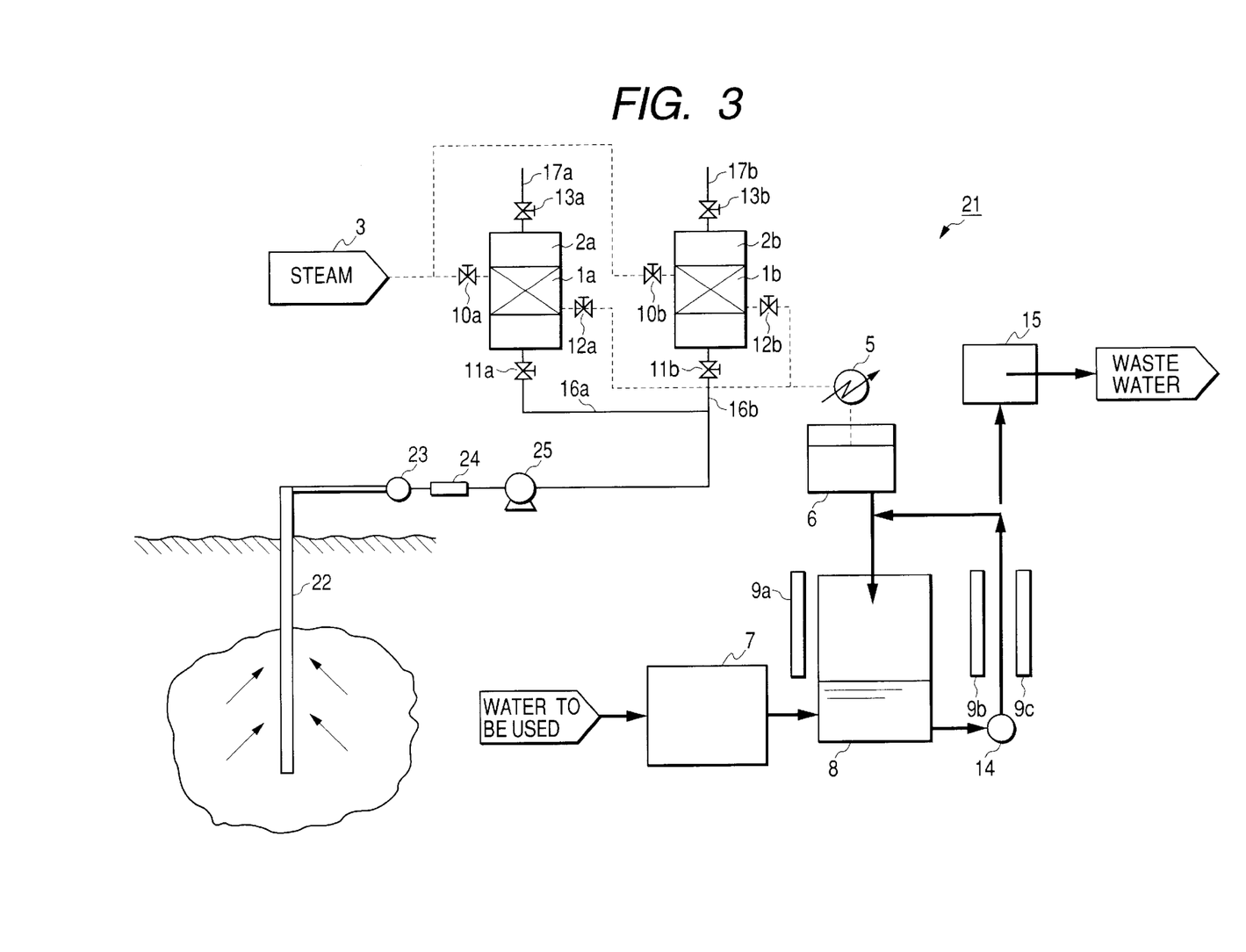
FIG. 3 is a diagrammatic illustration of an apparatus employed for polluted soil according to the present invention.

An example of the present invention using a polluted soil remediation apparatus will be described. FIG. 3 is a diagrammatic illustration of a polluted soil remediation apparatus 21, which is one embodiment of the present invention. A vacuum pump 23 for sucking air in a vertically dug well 22 is installed in the wall body surrounding the opening of the vertical well 22 of the polluted soil remediation apparatus 21 of the present invention. Further, the vacuum pump 23 is connected through a filter 24 and a blower to the lower part of the activated carbon tower 2 in which an activated carbon 1 for removing the pollutant substances is installed. Air sucked by the vacuum pump 23 is to be blown to the activated carbon tower 2 by the blower 25.

Hereinafter, the adsorption treatment for the pollutant substances in the raw gas was carried out by the activated carbon. The adsorption treatment and regeneration of the activated carbon were alternately carried out in the same manner as Example 1.

In an actual work field site polluted with trichloroethylene (TCE) and tetrachloroethylene (PCE), the effect of the polluted soil remediation apparatus of the present invention was confirmed. When soil suction (Soil Vapor Extraction method) was carried out by a well-known method for the soil polluted with TCE and PCE, the initial concentration of TCE was 700 to 900 ppm and the initial concentration of TCE was 300 to 700 ppm. The resulting polluted air was sent to the activated carbon tower to remove TCE and PCE existing in gaseous state in the air.

Simultaneously, the activated carbon that was not being used for adsorption treatment and had already adsorbed TCE and PCE was subjected to the desorption treatment. To a desorption solution, hydrochloric acid and sodium hypochlorite were added to control their final concentrations to be 0.006 mol/l and 0.002 mol/L, respectively, and then light irradiation was carried out by black fluorescent lamps (FL10BLB; 10 W produced by Toshiba Corporation). The radiation energy was about 0.2 to 0.6 mW/cm$^2$.

After operation, the treated water was discharged out and a part of the water was introduced into a container containing 100 mL of n-hexane, and after stirring for 10 minutes, the n-hexane layer was fractionated and subjected to ECD gas chromatography to measure the amounts of TCE and PCE.

As a result, TCE and PCE were not detected in the sample of the n-hexane layer from the treated water after the reaction, making it clear that the desorbed water containing these pollutant substances was purified.

EXAMPLE 3

The experiment was carried out in the same manner as Example 2, except that a functional water production apparatus by electrolysis was employed as the functional water production apparatus.

An apparatus sold under the trade name OASIS BIO-HALF and produced by Asahi Glass Engineering Co., Ltd. was employed as the functional water production apparatus by electrolysis, and 10 L of electrolytic functional water were added to the same desorbed water as that of Example 2. As a result, the polluted desorbed water had a pH of 2.7 and the remaining chlorine concentration of 30 to 50 mg/L. After light irradiation was carried out in the same manner as in Example 2, the concentrations of pollutant substances in the treated water were measured, and it was found that no pollutant substance was detected and that use of electrolytic water was effective to purify desorbed water containing the pollutant substances.

What is claimed is:

1. An apparatus for treating a gas containing a substance to be decomposed, comprising:
    adsorption means equipped with an adsorbent for adsorbing the substance to be decomposed;
    steam introduction means for bringing steam into contact with the adsorbent;
    condensation means for obtaining a condensed liquid containing the substance to be decomposed from the steam containing the substance;
    a reaction tank;
    condensed liquid supply means for supplying the condensed liquid to the reaction tank;
    hypochlorous acid supply means for supplying a solution containing hypochlorous acid to the reaction tank; and
    light irradiation means for irradiating an inside of the reaction tank with light.

2. The apparatus for treating a gas containing a substance to be decomposed by light irradiation in the presence of chlorine according to claim 1, comprising:
    (a) an adsorption tower including:
        an adsorption treatment region in which an adsorbent for adsorbing the substance to be decomposed is installed;
        gas introduction means for introducing a gas containing the substance to be brought into contact with the adsorbent into the adsorption treatment region;
        gas discharge means for discharging a gas out of the adsorbent installation region;
        steam introduction means for introducing steam, which is to be brought into contact with the adsorbent to desorb the substance adsorbed in the adsorbent and regenerate the adsorbent, into the adsorption treatment region; and
        steam discharge means for discharging the steam brought into contact with the adsorbent out of the adsorption treatment region;
    (b) a condenser for liquefying the steam discharged by the steam discharge means and obtaining a condensed liquid containing the substance to be decomposed;
    (c) a reaction tank for decomposing the substance in the condensed liquid discharged out of the condenser;
    (d) condensed liquid supply means for supplying the condensed liquid to the reaction tank; and
    (e) hypochlorous acid solution supply means for supplying a solution containing hypochlorous acid to the reaction tank;
    wherein the reaction tank comprises:
        a treatment region composed of a vapor phase part and a liquid phase part;
        mixed solution preparation means for preparing a mixed solution of the condensed liquid supplied by the condensed liquid supply means and the hypochlorous acid-containing solution supplied from the hypochlorous acid solution supply means, as the liquid phase part;
        aeration means for introducing a gas into the mixed solution;
        light irradiation means for irradiating the treatment region with light; and
        solution discharge means for discharging the solution existing in the liquid phase part.

3. The apparatus according to claim 1 or 2, further comprising means for producing a hypochlorous acid-containing solution, comprising a water tank, means for supplying water containing an electrolytic substance to the water tank, a pair of electrodes for applying potential to the electrolytic substance-containing water in the water tank, and an electric power source.

4. The apparatus according to claim 1 or 2, wherein the hypochlorous acid solution supply means comprises a first tank containing an aqueous hypochlorite solution, a second tank for storing at least one of an inorganic acid and an organic acid, and means for producing a hypochlorous acid-containing solution by mixing the aqueous hypochlorite solution and an acid from the second tank.

5. The apparatus according to claim 2, wherein the mixed solution has a hydrogen ion concentration (pH value) in a range of 1 to 4 and a remaining chlorine concentration in a range of 5 to 250 mg/L.

6. The apparatus according to claim 1 or 2, wherein the hypochlorous acid-containing solution is acidic electrolytic water produced in a peripheral part of an anode by electrolysis of water containing an electrolytic substance.

7. The apparatus according to claim 6, wherein the electrolytic substance is at least one of sodium chloride and potassium chloride.

8. The apparatus according to claim 7, wherein the hypochlorous acid-containing solution further contains an inorganic acid.

9. The apparatus according to claim 4, wherein the inorganic acid is at least one selected from the group consisting of hydrochloric acid, hydrofluoric acid, nitric acid, sulfuric acid, phosphoric acid, and boric acid.

10. The apparatus according to claim 8, wherein the inorganic acid is at least one selected from the group consisting of hydrochloric acid, hydrofluoric acid, nitric acid, sulfuric acid, phosphoric acid, and boric acid.

11. The apparatus according to claim 4, wherein the hypochlorous acid-containing solution is an aqueous hypochlorite solution.

12. The apparatus according to claim 11, wherein the hypochlorite is at least one of sodium hypochlorite and potassium hypochlorite.

13. The apparatus according to claim 1 or 2, wherein said light irradiation means is one irradiating light rays including those with wavelength of 300 to 500 nm.

14. The apparatus according to claim 1 or 2, wherein the substance to be decomposed is a halogenated aliphatic hydrocarbon compound.

15. The apparatus according to claim 14, wherein the halogenated aliphatic hydrocarbon compound is an aliphatic hydrocarbon compound substituted with at least one of chlorine and fluorine.

16. The apparatus according to claim 15, wherein the halogenated aliphatic hydrocarbon compound is at least one selected from the group of chloroethylene, 1,1- dichloroethylene (vinylidene chloride), cis-1,2-dichloroethylene, trans-1,2-dichloroethylene, trichloroethylene, tetrachloroethylene, chloromethane, dichloromethane, and trichloromethane.

17. The apparatus according to claim 2, wherein the aeration means further comprises means for reusing a part or all of the aerated gas to aerate the mixed solution.

18. The apparatus according to claim 2, wherein a ratio of the vapor phase part occupying the treatment region in the reaction tank is 10% by volume to 80% by volume.

19. The apparatus according to claim 2, further comprising a recirculation system for recirculating the mixed solution existing in the liquid phase part to the mixing solution production means.

20. The apparatus according to claim 19, wherein the mixed solution production means comprises solution discharge means for showering or spraying the mixed solution to the vapor phase part of the reaction tank.

21. The apparatus according to claim 2, wherein light irradiation by the light irradiation means is carried out for the vapor phase part of the reaction tank.

22. The apparatus according to claim 2, wherein said apparatus comprises the light irradiation means for irradiating light to the solution discharged by the solution discharge means from the reaction tank.

23. The apparatus according to claim 1 or 2, wherein said adsorbent is an activated carbon.

24. The apparatus according to claim 2, wherein the gas containing substance to be decomposed is obtained by vacuum extraction.

25. A method for treating a gas containing a substance to be decomposed, comprising the steps of:
  (A) bringing a gas containing a substance to be decomposed into contact with an adsorbent to adsorb the substance to be decomposed in the adsorbent;
  (B) bringing steam into contact with the adsorbent in which the substance to be decomposed is adsorbed to shift the substance to be decomposed to steam;
  (C) condensing the steam containing the substance to be decomposed to obtain a condensed liquid;
  (D) introducing the condensed liquid into a reaction tank and mixing the condensed liquid with a solution containing hypochlorous acid; and
  (E) irradiating the reaction tank with light to decompose the substance contained in the condensed liquid.

26. The method for treating a gas containing a substance to be decomposed according to claim 25, comprising the steps of:
  (1) bringing the gas containing the substance to be decomposed by light irradiation in the presence of chlorine into contact with the adsorbent to adsorb the substance in the adsorbent;
  (2) bringing steam into contact with the adsorbent adsorbing the substance to be decomposed to shift the substance to be decomposed to steam and regenerate the adsorbent;
  (3) condensing the steam containing the substance to be decomposed to obtain a condensed liquid;
  (4) mixing the condensed liquid and a hypochlorous acid-containing solution to obtain a mixed solution as a liquid phase part, wherein a vapor phase part and the liquid phase part contacting the vapor phase part constitute a treatment region in a reaction tank;
  (5) aerating the liquid phase part; and
  (6) decomposing the substance contained in the treatment region by irradiating the treatment region with light.

27. The method according to claim 25 or 26, wherein the hypochlorous acid-containing solution is produced by applying electric potential to water containing an electrolytic substance.

28. The method according to claim 25 or 26, wherein the hypochlorous acid-containing solution is produced by mixing an aqueous hypochlorite solution with at least one of an inorganic acid and an organic acid.

29. The treatment method according to claim 26, wherein the mixed solution has a hydrogen ion concentration (pH value) in a range of 1 to 4 and a remaining chlorine concentration in a range of 5 to 250 mg/L.

30. The method according to claim 25 or 26, wherein the hypochlorous acid-containing solution is acidic electrolytic water produced in a peripheral part of an anode by electrolysis of water containing an electrolytic substance.

31. The method according to claim 30, wherein the electrolytic substance is at least one of sodium chloride and potassium chloride.

32. The method according to claim 31, wherein the hypochlorous acid-containing solution further contains an inorganic acid.

33. The method according to claim 32, wherein the inorganic acid is at least one selected from the group consisting of hydrochloric acid, hydrofluoric acid, nitric acid, sulfuric acid, phosphoric acid, and boric acid.

34. The method according to claim 28, wherein the hypochlorous acid-containing solution is an aqueous hypochlorite solution.

35. The method according to claim 34, wherein the hypochlorite is at least one of sodium hypochlorite and potassium hypochlorite.

36. The method according to claim 25 or 26, wherein the light to be radiated to the reaction tank has a wavelength of 300 to 500 nm.

37. The method according to claim 25 or 26, wherein the substance to be decomposed is a halogenated aliphatic hydrocarbon compound.

38. The method according to claim 37, wherein the halogenated aliphatic hydrocarbon compound is an aliphatic hydrocarbon compound substituted with at least one of chlorine and fluorine.

39. The method according to claim 38, wherein the halogenated aliphatic hydrocarbon compound is at least one selected from the group consisting of chloroethylene, 1,1-dichloroethylene (vinylidene chloride), cis-1,2-dichloroethylene, trans-1,2-dichloroethylene, trichloroethylene, tetrachloroethylene, chloromethane, dichloromethane, and trichloromethane.

40. The method according to claim 26, wherein a part or all of the aerated gas brought into contact with the mixed solution is reused to be brought into contact with the mixed solution.

41. The method according to claim 26, wherein a ratio of the vapor phase part occupying the treatment region in the reaction tank is 10% by volume to 80% by volume.

42. The method according to claim 26, further comprising a recirculation system for mixing the mixed solution in the liquid phase part in the treatment region in the reaction tank with the condensed liquid.

43. The method according to claim 42, wherein the mixed solution to be re-introduced into the reaction region of the reaction tank by the recirculation system is introduced into the reaction region in a shower or sprayed state.

44. The method according to claim 26, wherein the light irradiation is carried out to the vapor phase part of the reaction tank.

45. The method according to claim 26, further comprising a step of irradiating a mixed solution discharged from the reaction tank with light.

46. The method according to claim 25 or 26, wherein the adsorbent is an activated carbon.

47. The method according to claim 25 or 26, wherein the gas containing substance to be decomposed is obtained by vacuum extraction.

* * * * *

UNITED STATES PATENT AND TRADEMARK OFFICE
CERTIFICATE OF CORRECTION

PATENT NO. : 6,444,015 B2
DATED : September 3, 2002
INVENTOR(S) : Kinya Kato

It is certified that error appears in the above-identified patent and that said Letters Patent is hereby corrected as shown below:

Column 4,
Line 40, "above described" should read -- above-described --.

Column 7,
Line 6, "semi-continuously" should read -- semi-continuous --.

Column 10,
Line 35, "water" should read -- water. --; and
Line 60, "illustrate" should read -- illustration --.

Column 11,
Line 15, "la" should read -- 1a --.

Column 12,
Line 8, "duced" should read -- duced by --.

Signed and Sealed this

Fourth Day of March, 2003

JAMES E. ROGAN
*Director of the United States Patent and Trademark Office*